United States Patent
Rose et al.

(10) Patent No.: US 12,328,087 B2
(45) Date of Patent: *Jun. 10, 2025

(54) POWER TOOL HAVING STAMPED BRAKE RESISTOR

(71) Applicant: MILWAUKEE ELECTRIC TOOL CORPORATION, Brookfield, WI (US)

(72) Inventors: David Rose, Pewaukee, WI (US); Daniel J. Tomcheck, Denmark, WI (US); Vincent M. Zornow, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,723

(22) Filed: Feb. 12, 2024

(65) Prior Publication Data

US 2024/0258941 A1 Aug. 1, 2024

Related U.S. Application Data

(63) Continuation of application No. 17/126,372, filed on Dec. 18, 2020, now Pat. No. 11,901,850.

(Continued)

(51) Int. Cl.
*H02P 3/12* (2006.01)
*B27B 5/38* (2006.01)
*H02P 3/22* (2006.01)

(52) U.S. Cl.
CPC .................. *H02P 3/12* (2013.01); *B27B 5/38* (2013.01); *H02P 3/22* (2013.01)

(58) Field of Classification Search
CPC .................. H02P 3/12; H02P 3/22; B27B 5/38
See application file for complete search history.

(56) References Cited

U.S. PATENT DOCUMENTS

| 1,498,969 A | 6/1924 | Homan |
| 2,360,266 A | 10/1944 | Osterheld |

(Continued)

FOREIGN PATENT DOCUMENTS

| CN | 2268293 Y | 11/1997 |
| CN | 2914268 Y | 6/2007 |

(Continued)

OTHER PUBLICATIONS

International Search Report and Written Opinion for Application No. PCT/US2020/065859 dated Apr. 19, 2021 (10 pages).

(Continued)

*Primary Examiner* — Karen Masih
(74) *Attorney, Agent, or Firm* — Michael Best & Friedrich LLP

(57) ABSTRACT

Systems and methods for braking a power tool using a stamped brake resistor. The power tool includes a motor, a trigger configured to be actuated, and a brake switch coupled to the motor. A brake resistor assembly is selectively coupled to the motor via the brake switch and includes a stamped brake resistor. The stamped brake resistor includes a terminal portion and a resistive portion. The resistive portion includes a planar serpentine path. A controller including an electronic processor and a memory is coupled to the trigger, the motor, and the brake switch, and is configured to control power delivered to the motor based on a position of the trigger, determine to brake the motor during operation of the motor, and activate, in response to determining to brake the motor, the brake switch to connect the stamped brake resistor to the motor.

20 Claims, 8 Drawing Sheets

Related U.S. Application Data

(60) Provisional application No. 62/949,900, filed on Dec. 18, 2019.

(56) References Cited

U.S. PATENT DOCUMENTS

| | | | |
|---|---|---|---|
| 2,570,692 | A | 10/1951 | Knight |
| 2,665,358 | A | 1/1954 | Du Bois |
| 3,453,585 | A | 7/1969 | Croft et al. |
| 4,588,976 | A | 5/1986 | Jaselli |
| 4,935,717 | A | 6/1990 | Osawa et al. |
| 5,287,083 | A | 2/1994 | Person et al. |
| 5,353,005 | A | 10/1994 | Salanki |
| 5,396,214 | A | 3/1995 | Kumar |
| 6,018,288 | A | 1/2000 | Waite et al. |
| 6,069,553 | A | 5/2000 | Black, III et al. |
| 6,106,541 | A | 8/2000 | Hurbis |
| 6,340,927 | B1 | 1/2002 | Peschl |
| 6,522,239 | B1 | 2/2003 | Peschl |
| 7,876,195 | B2 | 1/2011 | Chen |
| 8,643,464 | B2 | 2/2014 | Nazzaro |
| 2013/0120103 | A1 | 5/2013 | Nazzaro |
| 2013/0328660 | A1 | 12/2013 | Sshott et al. |
| 2017/0271952 | A1 | 9/2017 | Gurr et al. |
| 2017/0354088 | A1 | 12/2017 | Yuki et al. |
| 2019/0013762 | A1 | 1/2019 | Yamaguchi et al. |

FOREIGN PATENT DOCUMENTS

| | | | | |
|---|---|---|---|---|
| CN | 201134308 | | 10/2008 | |
| CN | 201655447 | | 11/2010 | |
| CN | 107705943 | A | 2/2018 | |
| CN | 208173675 | U * | 11/2018 | |
| CN | 110333012 | A | 10/2019 | |
| DE | 3708436 | | 9/1988 | |
| DE | 3901157 | | 7/1990 | |
| DE | 4225724 | | 4/1998 | |
| DE | 10239625 | | 3/2004 | |
| DE | 112010003039 | T5 * | 6/2012 | ........... E21B 17/028 |
| EP | 0001520 | | 9/1981 | |
| EP | 0203041 | | 9/1989 | |
| EP | 0622813 | | 7/1997 | |
| EP | 0812051 | | 12/1997 | |
| EP | 2762277 | | 8/2014 | |
| JP | S60216501 | | 10/1985 | |
| JP | S62115911 | | 7/1987 | |
| JP | H0878201 | | 3/1996 | |
| JP | H09164501 | | 6/1997 | |
| JP | H1055220 | | 2/1998 | |
| JP | 2002281777 | | 9/2002 | |
| JP | 2014148006 | | 8/2014 | |
| JP | 2017115594 | | 6/2017 | |
| JP | 2017225213 | | 12/2017 | |
| WO | 2019105736 | | 6/2019 | |

OTHER PUBLICATIONS

Japanese Patent Office Action for Application No. 2022-534679 dated Sep. 19, 2023 (5 pages including English translation).
Extended European Search Report for Application No. 20901668.2 dated Dec. 14, 2023 (8 pages).

* cited by examiner

POWER TOOL HAVING STAMPED BRAKE RESISTOR

RELATED APPLICATIONS

This application is a continuation of U.S. patent application Ser. No. 17/126,372, filed Dec. 18, 2020, which claims the benefit of U.S. Provisional Patent Application No. 62/949,900, filed Dec. 18, 2019, the entire content of each of which is hereby incorporated by reference.

FIELD

Embodiments described herein relate to a brake resistor.

SUMMARY

In a permanent magnet brushless motor having a permanent magnet rotor and an associated stator having stator windings, rotation of the rotor causes a changing magnetic field that induces a current within windings of the stator. This current, in turn, produces a voltage in the stator windings, known as a back-emf of a motor. When power ceases to be supplied to stator windings to stop driving the motor, the inertia will cause the rotor to continue to rotate for some time as the rotor decelerates. The still-rotating rotor, thus, continues to generate back-emf, effectively turning the motor into a generator. The back-emf also generates an opposing force that assists in slowing the motor. However, if unchecked, the back-emf may become excessive and damage components of the motor drive circuitry. To avoid excess back-emf, a braking resistor may be used. The braking resistor is coupled to the stator windings during braking to dissipate the energy generated by the still-rotating rotor as heat.

Typical, barrel-shaped resistors having sufficient resistance to serve as brake resistors may be large and undesirable in applications where space is limited. Additionally, dissipating heat from brake resistors can require large heat sinks or other heat sinking techniques that are undesirable in applications where space is limited.

Some embodiments described herein provide a power tool, and a method of using a power tool, having a stamped braking resistor. The stamped braking resistor may be coupled to one or more planar heat sinks enabling improved heat dissipation and a compact braking resistor assembly. Accordingly, in some embodiments, power tools and methods of using power tools described herein include improved braking and corresponding heat dissipation.

In some embodiments, a power tool is provided including a motor, a trigger configured to be actuated, a brake switch coupled to the motor, and a brake resistor assembly. The brake resistor assembly is selectively connected to the motor via the brake switch and includes a stamped brake resistor, which includes a terminal portion and a resistive portion. The resistive portion includes a planar serpentine path. The power tool further includes a controller including an electronic processor and a memory. The controller is connected to the trigger, the motor, and the brake switch. The controller is configured to control power delivered to the motor based on a position of the trigger, determine to brake the motor during operation of the motor, and activate, in response to determining to brake the motor, the brake switch to connect the stamped brake resistor to the motor.

In some embodiments, the brake resistor assembly further includes a first insulating pad and a second insulating pad that sandwich the stamped brake resistor. In some embodiments, the brake resister assembly further includes a first heat sink and a second heat sink that sandwich the first insulating pad and the second insulating pad.

In some embodiments, the resistive portion and the terminal portion are situated on the same plane. In some embodiments, the resistive portion includes a first leg, a second leg perpendicular to the first leg, a third leg, and a fourth leg perpendicular to the third leg. In some embodiments, the first leg and the third leg are separated via an opening in the resistive portion. In some embodiments, the second leg and the fourth leg are coupled via the planar serpentine path. In some embodiments, the stamped resistor further includes interlock gaps. In some embodiments, the stamped resistor is composed of at least one selected from the group consisting of zinc, aluminum, chromium, iron, brass, bronze, stainless steel, carbon, metal-oxide, phenol formaldehyde resin, tantalum, cermet, and a metallic alloy.

In some embodiments, a method of braking a motor in a power tool is provided. The method includes controlling, by a motor controller of the power tool, power delivered to the motor based on a position of a trigger. The method includes determining, with the motor controller, to brake the motor during operation of the motor. In response to determining to brake the motor, the method includes activating, with the motor controller, a brake switch to connect a stamped brake resistor with the motor. The stamped brake resistor includes a terminal portion and a resistive portion, wherein the resistive portion includes a planar serpentine path. In response to the brake switch being activated, the method includes receiving, with the stamped brake resistor, motor current from the motor to thereby brake the motor.

In some embodiments, the method includes determining, with the motor controller, to brake the motor in response to detecting a release of the trigger. In some embodiments, the motor current received by the brake resistor is a current resulting from a back EMF of the motor.

In some embodiments, the method includes selectively activating, with the motor controller and to control power delivered to the motor based on a position of a trigger, switching elements coupled to phases of the motor. Additionally, in some embodiments, selectively activating the power switching elements connected to phases of the motor includes selectively activating the power switching elements based on a position of a rotor while the brake switch is activated. In some embodiments, the method includes opening, with the motor controller and in response to determining to brake the motor, a switch connected between a power source and the power switching elements.

In some embodiments, braking system for a power tool is provided. The system includes a stamped resistor having a terminal portion and a resistive portion. The resistive portion includes a planar serpentine path forming a plurality of leaves with a gap between each leaf. The system further includes a first insulating pad and a second insulating pad that sandwich the stamped resistor, and a first heat sink and a second heat sink that sandwich the first insulating pad and the second insulating pad.

In some embodiments, the terminal portion includes a terminal for connecting to a voltage source, the terminal being situated on a same plane as the stamped resistor. In some embodiments, each leaf of the plurality of leaves has a width of approximately 2.5 mm, and wherein each gap of the plurality of gaps has a width of at least 1.5 mm. In some embodiments, the stamped resistor further includes interlock gaps. In some embodiments, the serpentine path includes a filling substance located within each gap formed between adjacent leaves.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in a non-transitory, computer-readable medium. Similarly, embodiments described herein may be implemented as a non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Other aspects of the embodiments will become apparent by consideration of the detailed description and accompanying drawings.

DETAILED DESCRIPTION

Figure 1:
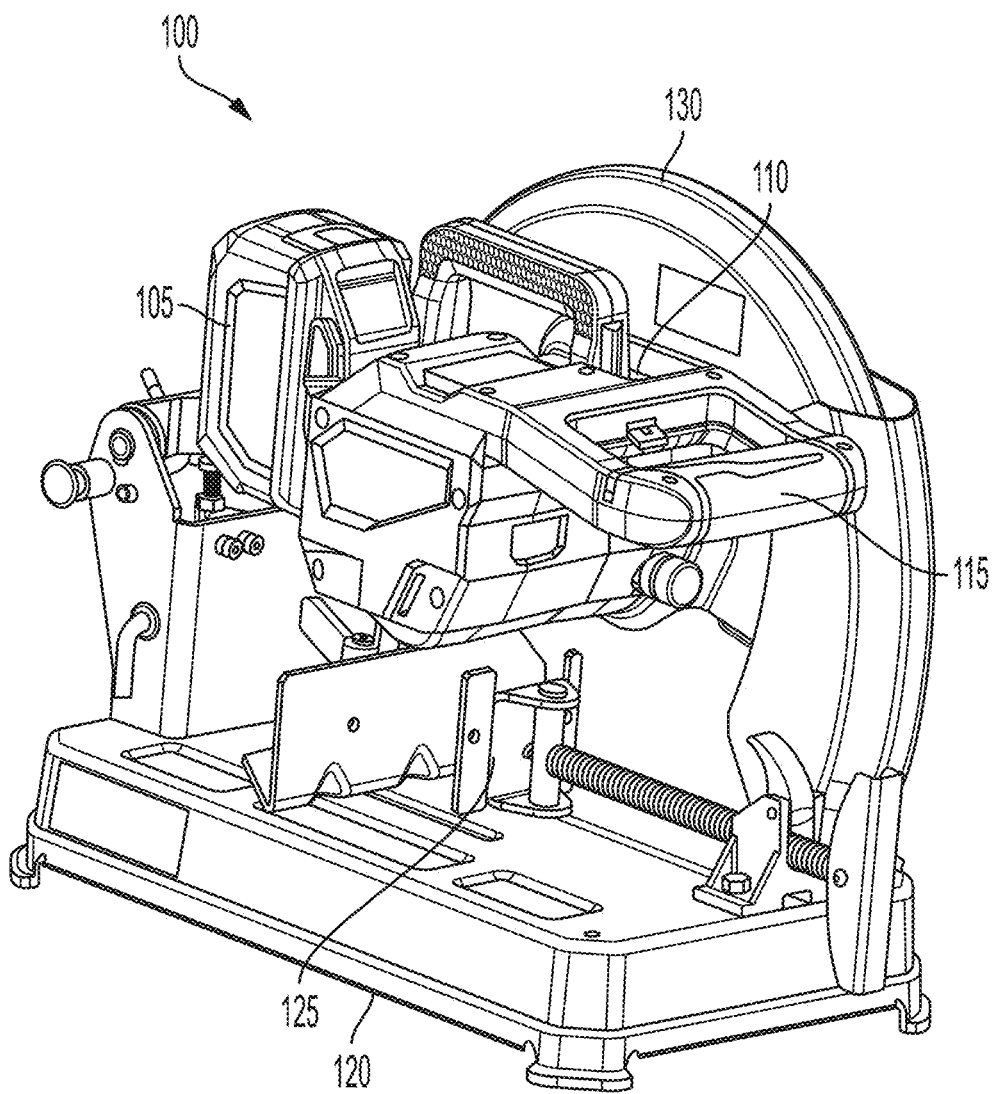
FIG. 1 illustrates a power tool, according to some embodiments.

FIG. 1 illustrates an example of a power tool 100 with a battery pack 105. In the illustrated embodiment, the power tool 100 is a chop saw having a housing 110 with a handle 115. The housing 110 is coupled to a base 120, which includes a clamp 125 and a blade housing 130. The power tool 100 has a motor 630 (see FIG. 6) configured to rotate an arbor holding a blade (not shown) of the blade housing 130. The rotating blade is configured to cut a workpiece on the base 120 secured by the clamp 125. Although the power tool 100 illustrated in FIG. 1 is a chop saw, the present description applies also to other power tools having a motor such as, for example, an impacting wrench, an AC grinder, a hammer drill, an impact hole saw, an impact driver, a drill, a reciprocating saw, a nailer, a stapler, and the like. The present description also applies to brushed and brushless motors and controls. In other words, in some embodiments, the power tool 100 includes a brushed motor in place of the brushless motor 630.

Figure 2:
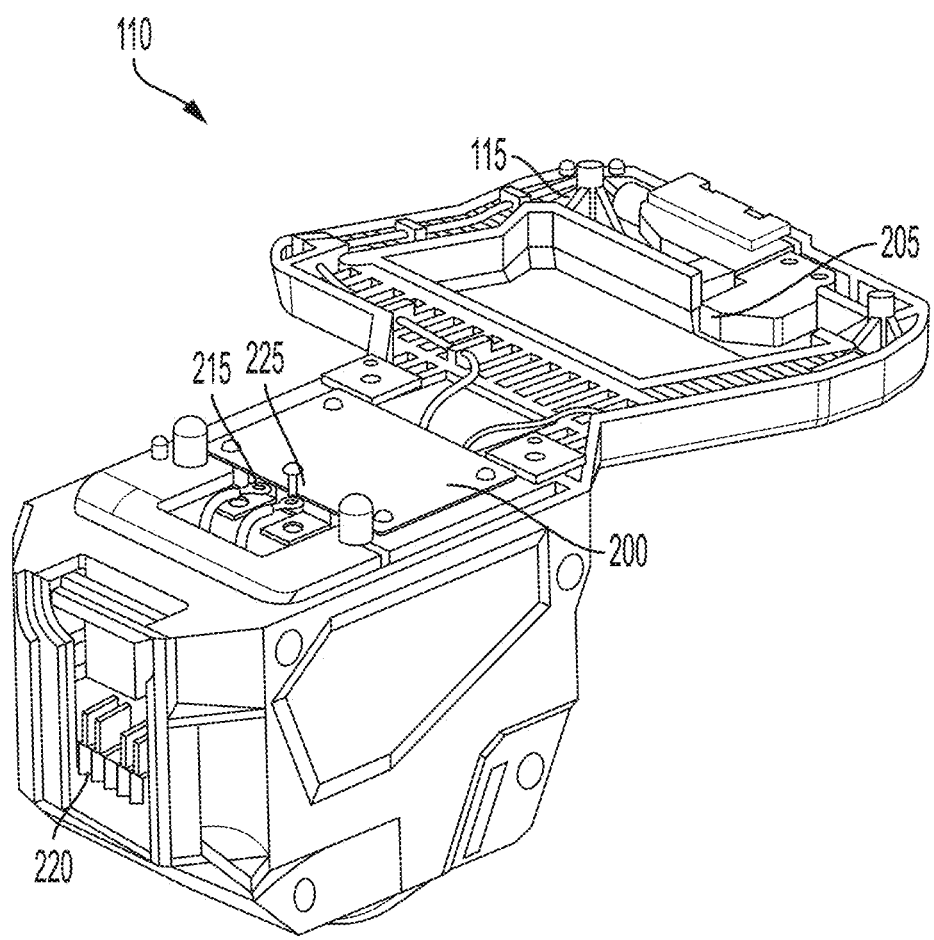
FIG. 2 illustrates a perspective view of the power tool shown in FIG. 1 with a top housing portion removed, according to some embodiments.

FIG. 2 illustrates a perspective view of the housing 110 with a top housing portion removed. The handle 115 of the housing 110 further includes a trigger 205. The trigger 205 is electronically coupled to an electronic processor (see FIG. 7). During operation, the trigger 205 is pulled to activate the power tool 100 and rotate a motor 630 (see FIG. 6) of the power tool 100. Releasing the trigger 205 stops the flow of power to the motor 630, but may not immediately stop the motor 630. A brake resistor assembly 200 (detailed further below) is situated in the top portion of the housing 110 and is coupled to a power switching network 700 and brake switch 640 (see FIG. 7) via power terminals 215. In some embodiments, the power terminals 215 couple to the power switching network 700 and brake switch 640 via terminal fasteners 225. In some embodiments, the power terminals 215 may couple to the electronic processor via a welding, fusing, or soldering process. The housing 110 is configured to receive the battery pack 105 (see FIG. 1) via power interface 220.

In some embodiments, the power interface 220 is similar to, and thus the power tool battery pack 105 is also compatible with, power interfaces of a suite of two or more types of devices selected from power tools, fluid flow control devices, test and measurement devices, work site radios, and work lights. The battery pack 105 includes a battery housing within which are one or more battery cells, which may be lithium ion ("Li-ion") cells, Nickel-Cadmium ("Ni-Cad") cells, or cells of another chemical type. The cells, collectively, may provide nominal voltages of different values, depending on the pack. For example, the battery pack 105 may have a nominal output voltage of 4V, 12V, 18V, 28V, 36V, 40V, a voltage between levels, or other levels. In some embodiments, the power interface 220 is an alternating current (AC) power interface that is configured to be connected to a standard AC outlet that is further coupled to an AC power grid or AC generator. For instance, the AC source may include an approximately 120 V, 60 Hz power signal or an approximately 240 V, 50 Hz power signal. In other words, in some embodiments, the power tool 100 includes an AC power cord to receive AC power (e.g., from a wall outlet) to drive the motor 630, rather than a battery interface to receive the battery pack 105 providing DC power.

Figure 3:
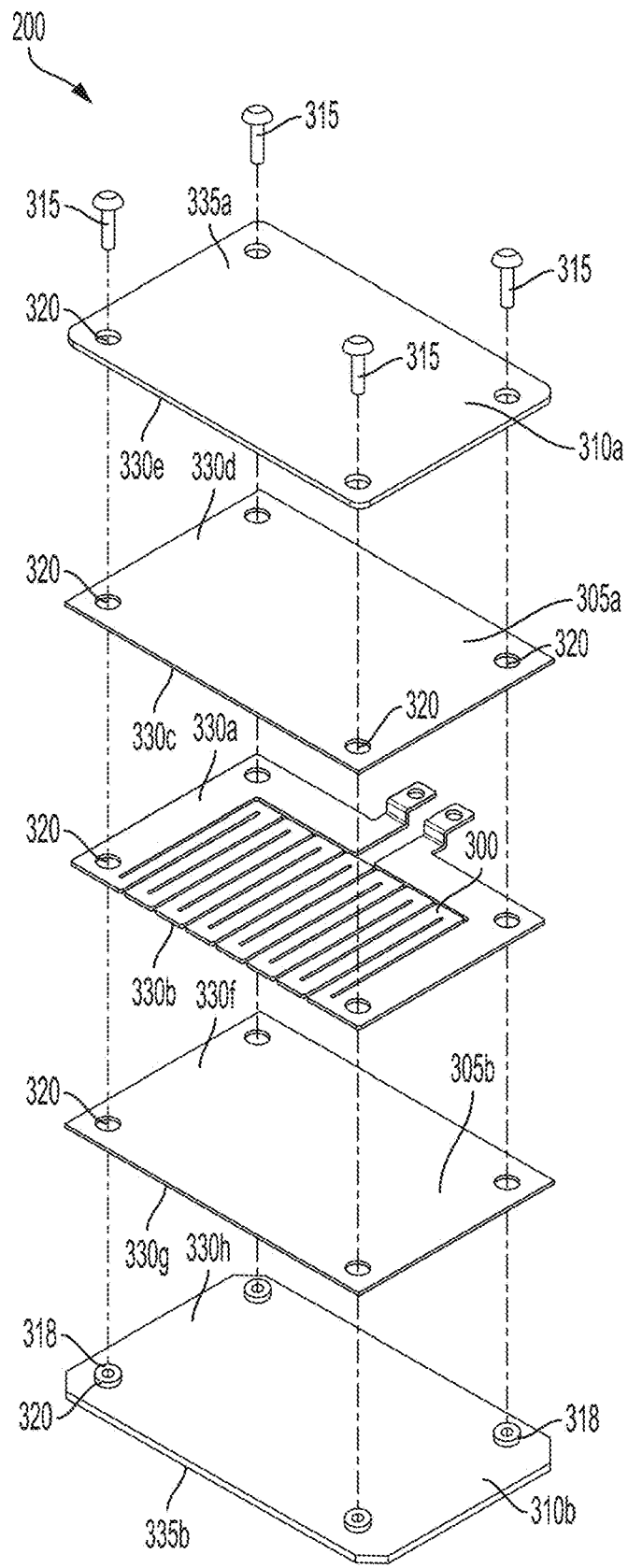
FIG. 3 illustrates an exploded view of a brake resistor assembly as shown in FIG. 2, according to some embodiments.
Figure 4:
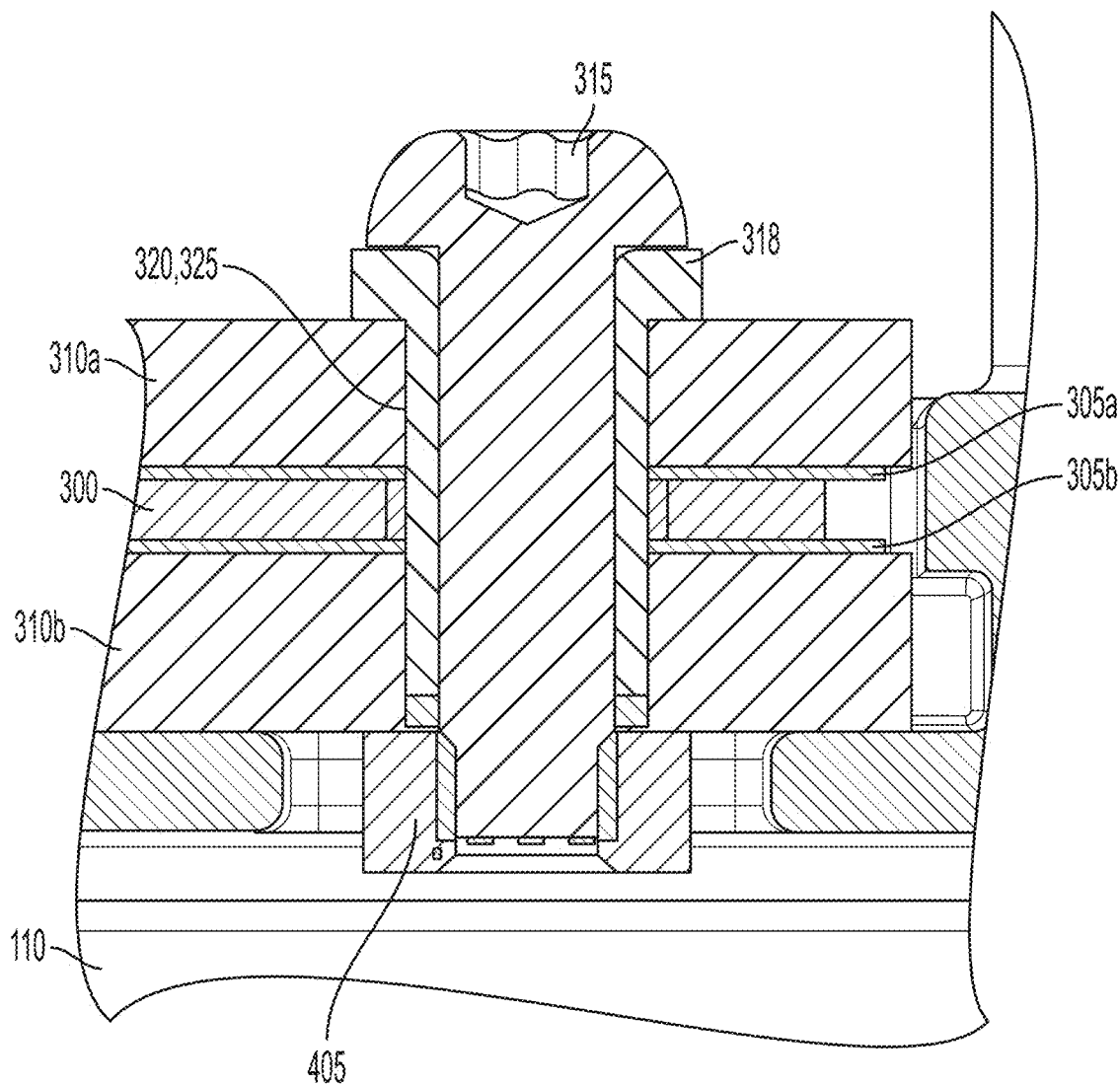
FIG. 4 illustrates a partial side view of the brake resistor assembly as shown in FIG. 3, according to some embodiments.

FIG. 3 shows an exploded view of the brake resistor assembly 200. The brake resistor assembly 200 includes a stamped brake resistor 300, a first insulating pad 305a, a second insulating pad 305b, a first heat sink 310a, a second heat sink 310b, a plurality of fasteners 315, and a plurality of insulating sleeves 318. In the illustrated example, each of the stamped brake resistor 300, the first insulating pad 305a, the second insulating pad 305b, the first heat sink 310a, and the second heat sink 310b includes four holes 320, one at each outer corner. The holes 320 at each respective corner align such that when the stamped brake resistor 300, insulating pads 305a,b, and heat sinks 310a,b are stacked, a passage 325 is formed at each corner (see, e.g., FIG. 4). Each of the fasteners 315 passes through aligned, respective holes 320 of the stamped brake resistor 300, insulating pads 305a,b, and heat sinks 310a,b (i.e., through one of the passages 325) to secure these elements together and to attach the brake resistor assembly 200 to the power tool 100. In some embodiments, each of the passages 325 also receives one of the insulating sleeves 318. More specifically, as illustrated in FIG. 4, each of the fasteners 315 passes through one of the passages 325 and one of the insulating sleeves 318, and engages a threaded bore 405 of the housing 110 of the power tool 100 to attach the brake resistor assembly 200 to the power tool 100. The insulating sleeve 318 restricts electrical current flowing through the stamped brake resistor 300 from entering the fastener 315. While each of the stamped brake resistor 300, insulating pads 305a,b, and heat sinks 310a,b is illustrated as including four holes 320, in some embodiments, they are provided with more or fewer holes 320, with holes 320 in different locations than the corners, or a combination thereof.

When assembled, as shown in FIG. 4, the stamped brake resistor 300 is sandwiched between the first insulating pad 305a and the second insulating pad 305b; and, the collection of the first insulating pad 305a, the stamped brake resistor 300, and the second insulating pad 305b are sandwiched between the first heat sink 310a and the second heat sink 310b. As a result, the first insulating pad 305a is positioned on a first side of the stamped brake resistor 300, and the second insulating pad 305b is positioned on a second, opposite side of the stamped brake resistor 300. Planes formed by the first insulating pad 305a and the second insulating pad 305b are substantially parallel to one another. The first heat sink 310a is positioned on a first side of the first insulating pad 305a, and the second heat sink 310b is positioned on a second side of the second insulating pad 305b. Planes formed by the first heat sink 310a and the second heat sink 310b are substantially parallel to one another. While FIG. 4 illustrates a cross-section at one corner of the brake resistor assembly 200, the other corners of the brake resistor assembly 200 may include similar configurations.

Returning to FIG. 3, each of the stamped brake resistor 300, the first insulating pad 305a, the second insulating pad 305b, the first heat sink 310a, and the second heat sink 310b includes one or two generally planar engaging surfaces 330 (labeled individually 330a-j) to engage an adjacent one of the engaging surfaces 330 of another of the stamped brake resistor 300, the first insulating pad 305a, the second insulating pad 305b, the first heat sink 310a, and the second heat sink 310b. For example, the stamped brake resistor 300 includes an engaging surface 330a that engages an engaging surface 330c of the first insulating pad 305a, and the first heat sink 310a includes an engaging surface 330e that engages an engaging surface 330d of the first insulating pad 305a. Additionally, the engaging surface 330a faces an opposite direction as the engaging surface 330b; the engaging surface 330c faces an opposite direction as the engaging surface 330d; and the engaging surface 330f faces an opposite direction as the engaging surface 330g. Further, the first heat sink 310a includes an outer facing surface 335a and the second heat sink 310b includes an outer facing surface 335b. The outer facing surface 335a faces an opposite direction as the engaging surface 330e, and the outer facing surface 335b faces an opposite direction as the engaging surface 330h.

The insulating pads 305a,b are composed of a material that is electrically insulating and restricts current from traveling from the stamped brake resistor 300 to the heat sinks 310a,b. In some embodiments, the insulating pads 305a,b are composed of a material that is also thermally conductive to conduct heat generated in the stamped brake resistor 300 to the heat sinks 310a,b, respectively. The heat sinks 310a,b dissipate heat generated by the stamped brake resistor 300 away from the stamped brake resistor 300 and into the ambient environment within the housing 110. In some embodiments, the housing 110 further includes one or more vents into the ambient environment around the power tool 100 and, accordingly, the heat dissipated by the heat sinks 310a,b is at least partially dissipated into the ambient environment around the power tool 100 via the one or more vents.

In some embodiments, the stamped brake resistor 300 is composed of zinc. In some embodiments, the stamped brake resistor 300 is composed of another conductive material, such as carbon, metal-oxide, phenol formaldehyde resin, tantalum, cermet, a metallic alloy including elements such as aluminum, copper, nickel, chromium, and/or iron, brass, bronze, stainless steel, or the like. In some embodiments, the insulating pads 305a,b are composed of silicon. In some embodiments, the insulating pads 305a,b are composed of another insulating material, such as glass, paper, Teflon, or porcelain.

Figure 5A:
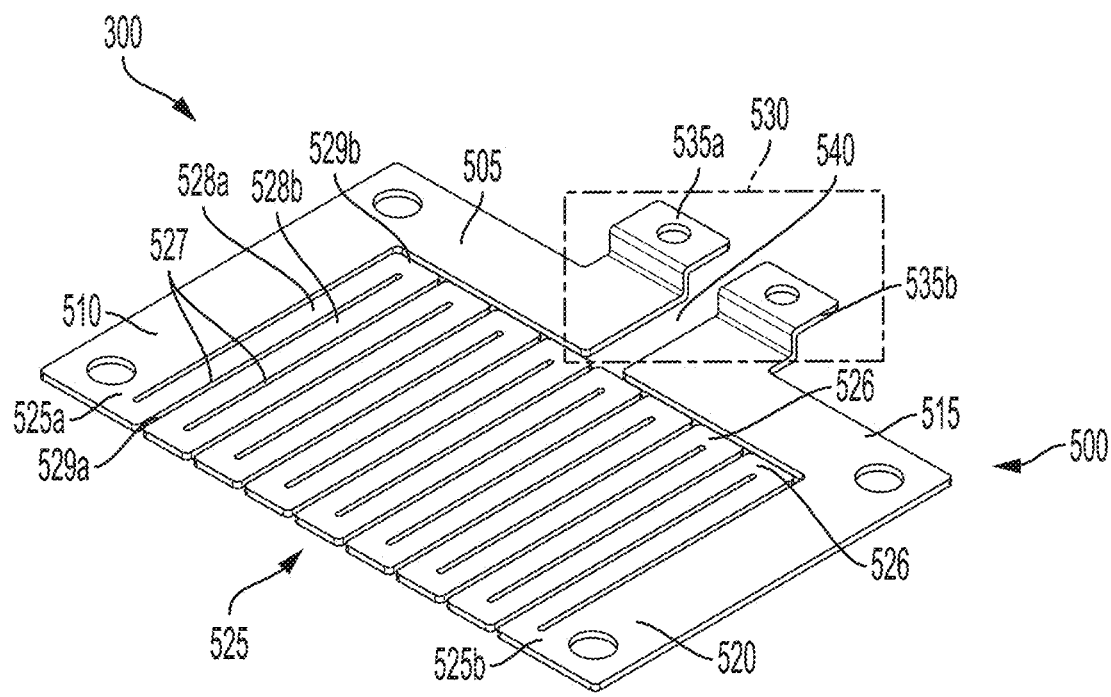
FIGS. 5A-5B illustrate a stamped brake resistor as shown in FIG. 3, according to some embodiments.

FIG. 5A shows a perspective view of the stamped brake resistor 300. The stamped brake resistor 300 includes a resistive portion 500 and a terminal portion 530. The resistive portion 500 includes a first leg 505, a second leg 510, a third leg 515, and a fourth leg 520. The first leg 505 is coupled to the terminal portion 530 at a first distal end and coupled to the second leg 510 at a second distal end, and the first leg 505 is substantially perpendicular to the second leg 510. The third leg 515 is coupled to the terminal portion 530 at a first distal end and coupled to the fourth leg 520 at a second distal end, and the third leg 515 is substantially perpendicular to the fourth leg 520. The first leg 505 and the third leg 515 are separated by a gap 540 of the terminal portion 530.

The second leg 510 and the fourth leg 520 extend substantially parallel to one another, away from an end of the stamped brake resistor 300 having the first leg 505 and the third leg 510. The second leg 510 has a first distal end connected to the first leg 505, and a second distal end coupled to a first end 525a of a planar serpentine path 525. The fourth leg 520 has a first distal end connected to the third leg 515, and a second distal end coupled to a second end 525b of the planar serpentine path 525.

The second leg 510 and the fourth leg 520 are coupled via the planar serpentine path 525. In some embodiments, the planar serpentine path 525 is a winding path that is multi-turn and planar. For example, as illustrated, the planar serpentine path 525 includes a plurality of leaves 526 forming a plurality of gaps 527. Each leaf 526 includes a first member 528a extending substantially parallel to a second member 528b, where the first and second members 528a,b are separated by one of the plurality of gaps 527 at one distal end 529a and joined at a turn point at a second distal end 529b. In the illustrated embodiment, the planar serpentine path 525 includes eight leaves 526; however, in some embodiments, more or fewer leaves 526 are included in the planar serpentine path 525.

For clarity in the illustration, only some of the leaves 526, gaps 527, members 528a,b, and ends 529a,b are labeled along the planar serpentine path 525. In some embodiments, each leaf 526 of the planar serpentine path 525 has a width of at least 2.5 mm. In some embodiments, each gap of the plurality of gaps 527 has a width of at least 1.5 mm. In some embodiments, each of the legs 510 and 520, taken individually, have a width that is greater than the width of each the leaves 526 taken individually; however, collectively, the width of the leaves 526 (i.e., the width of the planar serpentine path 525) is greater than the width of the legs 510 and 520 taken individually or together. Additionally, the gaps 527, taken individually, have a width that is less than the width of the leaves 526, taken individually, and less than the width of the members 528a,b, taken individually.

In some embodiments, such as the embodiment of FIG. 5A, the planar serpentine path 525 is bounded by the first leg 505, the second leg 510, the third leg 515, and the fourth leg 520. In some embodiments, the members 528a,b turn before extending further than the end of the stamped brake resistor 300 opposite the terminal portion 530 (i.e., the end at which the planar serpentine path 525 connects to the second leg 510 and the fourth leg 520). In other words, the second leg 510 and the fourth leg 520 extend distally as far or farther than the members 528a,b of the leaves 526 extend.

Figure 5B:
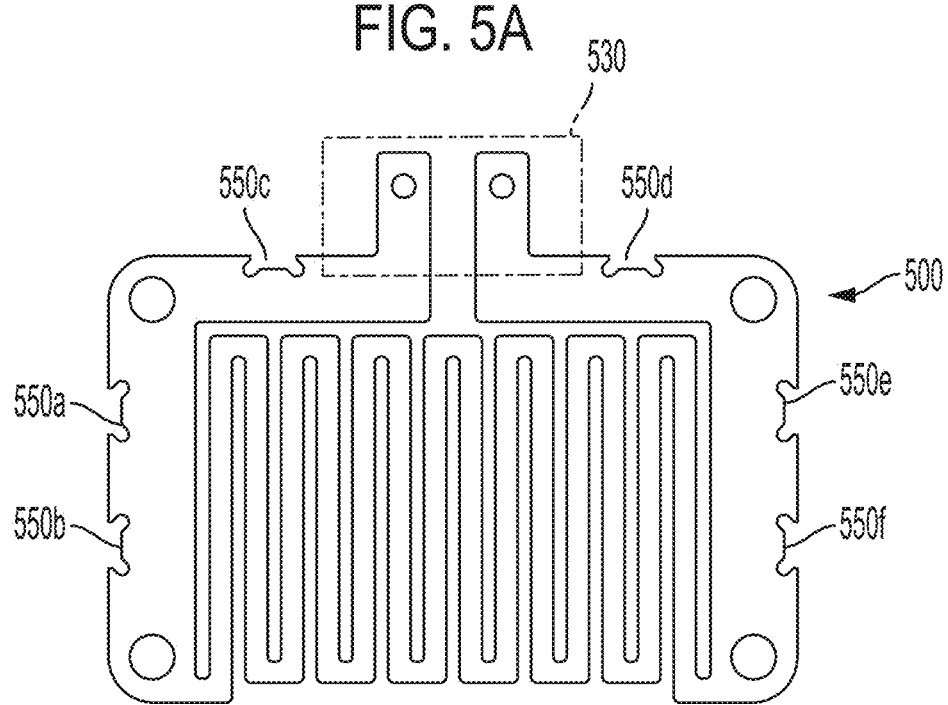

In some embodiments, the winding path, or the planar serpentine path 525, includes a filling substance located within each gap 527. For example, without a filling, the leaves 526 may begin to morph from the desired shape over time or during construction of the stamped brake resistor 300. A polymethyl methacrylate (PMMA) filling may be placed in each gap 527 formed between each leaf 526 to maintain the correct shape of the stamped brake resistor 300. Additionally, the stamped brake resistor 300 may include a plurality of interlock gaps 550a-f to assist with securing the stamped brake resistor 300 during tooling, as shown in FIG. 5B. For example, the interlock gaps 550a-g may engage corresponding features on a mold that retains the stamped brake resistor 300 while the PMMA filling is injected into the mold to fill in the gaps 527.

Figure 7:
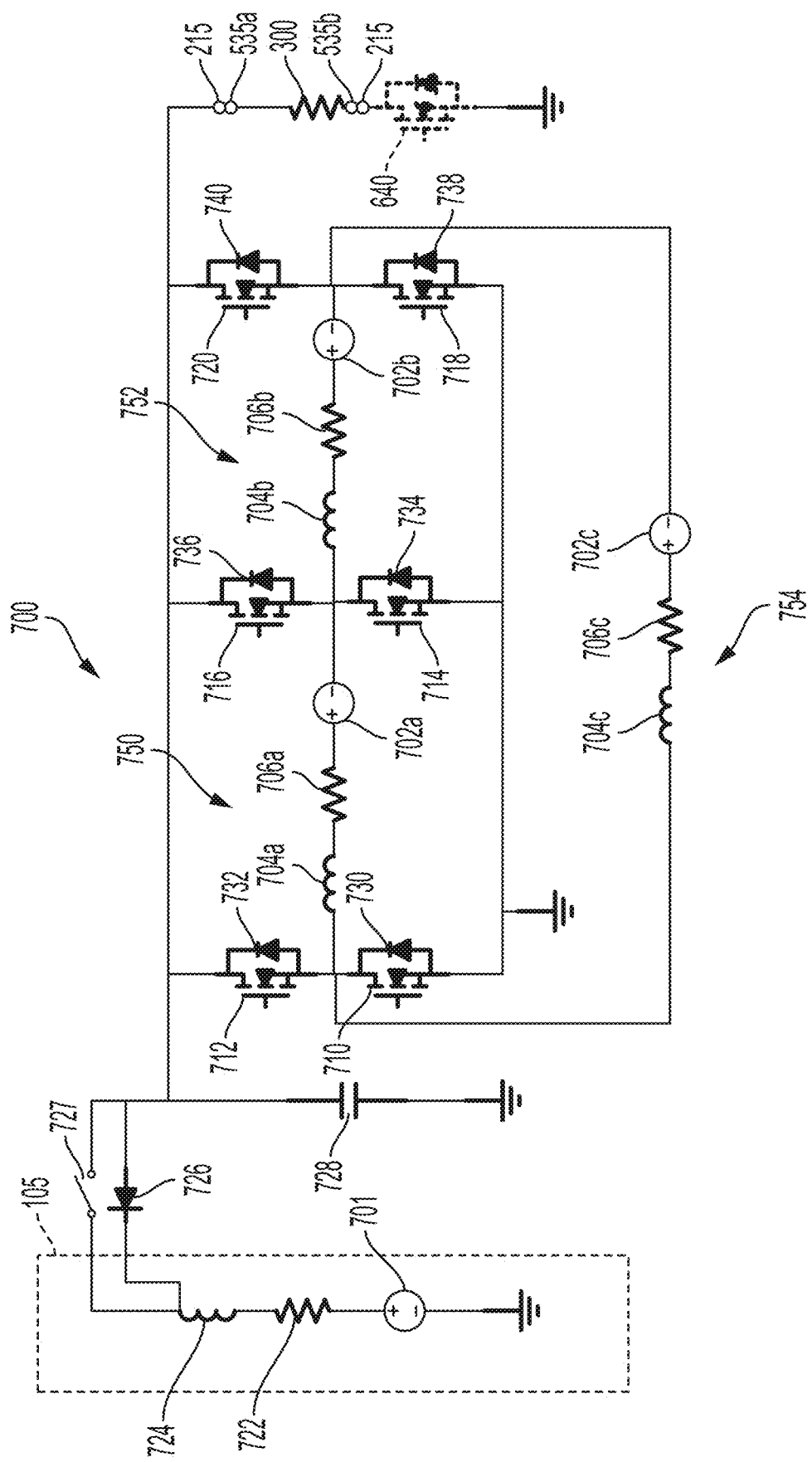
FIG. 7 illustrates a circuit diagram of the power tool as shown in FIG. 1, according to some embodiments.

Terminal portion 530 includes a first terminal 535a and a second terminal 535b configured to connect the stamped brake resistor 300 to the power terminals 215 (see FIGS. 2 and 7). The first terminal 535a and the second terminal 535b are separated via a gap 540. In some embodiments, the resistive portion 500 is situated on a first plane. As illustrated in FIG. 5A, the terminal portion 530 may include a bending portion that bends the terminal portion 530 such that the first terminal 535a and the second terminal 535b lie in second plane that is a separate parallel plane from the first plane. In other embodiments, such as illustrated in FIG. 5B, the terminal portion 530 may lie in the same plane as the resistive portion 500 (e.g., the terminal portion 530 is flat with respect to the resistive portion 500).

Figure 6:
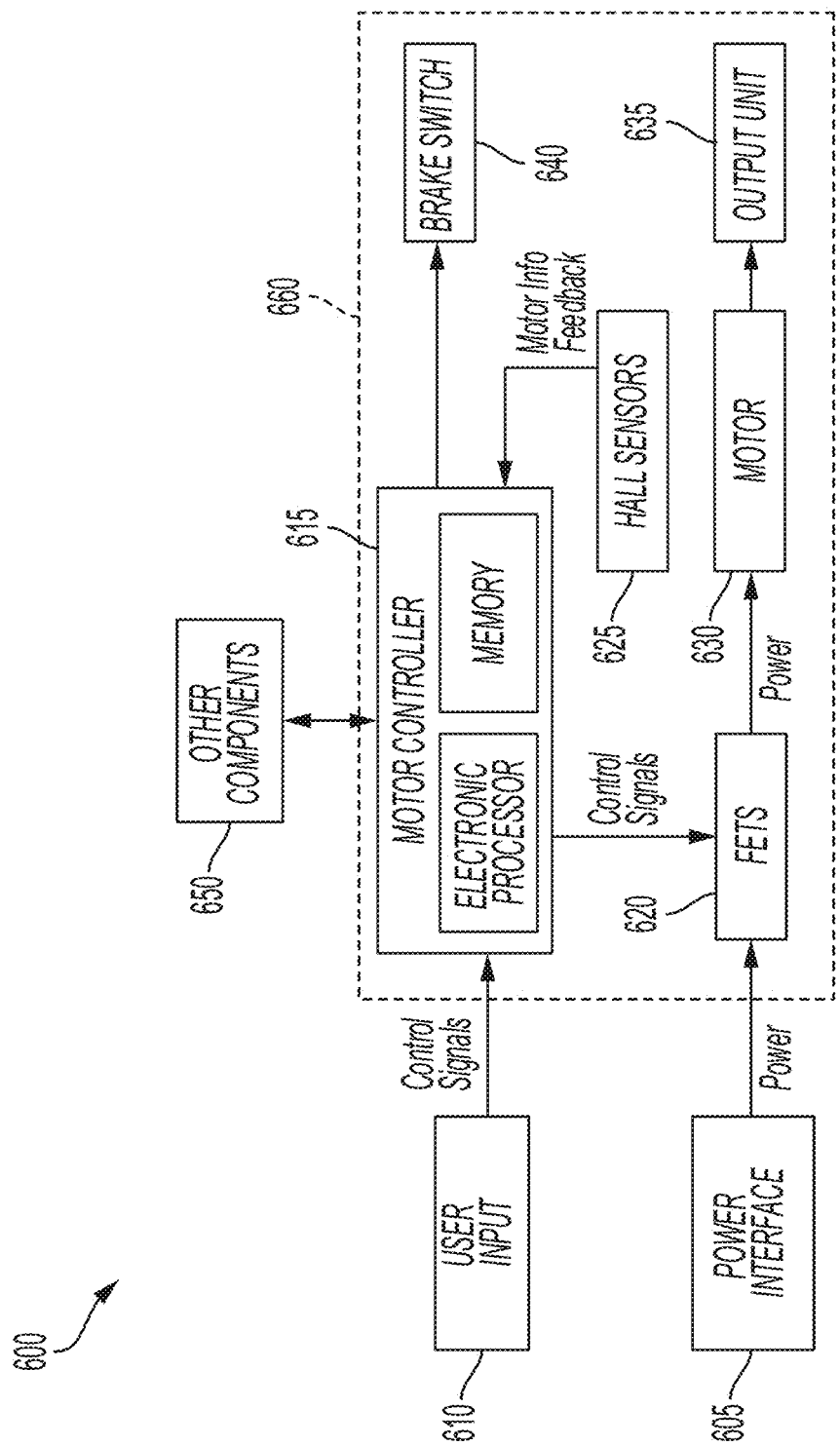
FIG. 6 illustrates a block diagram of the power tool as shown in FIG. 1, according to some embodiments.

FIG. 6 is a block diagram of the exemplary power tool 100 of FIG. 1. A system 600 of the power tool 100 includes, among other things, the power interface 605, field effect transistors (FETs) 620, a motor 630, an output unit 635, Hall sensors 625, a motor controller 615, user input 610, a brake switch 640, and other components 650 (battery pack fuel gauge, work lights (LEDs), current/voltage sensors, etc.). The power interface 605 may be, for example, the power interface 220 of FIG. 2. The motor controller 615 may also be referred to as an electronic motor controller or a motor microcontroller and includes, among other things, an electronic processor and a memory. In some embodiments, the memory stores instructions that are executed by the electronic processor to implement the functionality of the motor controller 615 described herein.

The Hall sensors 625 provide motor information feedback, such as motor rotational position information, which can be used by the motor controller 615 to determine motor position, velocity, and/or acceleration. The motor controller 615 receives user controls from user input 610, such as by depressing the trigger 205 or shifting a forward/reverse selector of the power tool 100. In response to the motor information feedback and user controls, the motor controller 615 transmits control signals (e.g., pulse width modulated signals) to control the FETs 620 to drive the motor 630. For example, by selectively cyclically enabling and disabling the FETs 620, power from the power interface 605 is selectively applied to stator windings of the motor 630 to cause rotation of a rotor of the motor 630. The rotating rotor of the motor 630 drives the output unit 635. Upon receiving an indication to stop the motor 630 from user input 610, such as a depression of the trigger 205, the electronic processor of the motor controller 615 may activate the brake switch 640 to enable a braking mechanism of the motor 630. Although not shown, the motor controller 615 and other components of the power tool 100 are electrically coupled to and receive power from the power interface 605. The FETs 620 may also be referred to as power switching elements. The FETs 620, motor 630, Hall sensors 625, motor controller 615, and output unit 635 may be referred to as electromechanical components 660 of the power tool 100.

FIG. 7 illustrates a power switching network 700 of the electromechanical components 660. In the illustrated embodiment, the motor 630 is a brushless DC motor including three phases. For example, the motor 630 may include an outer stator having six stator windings arranged in three phases, and an inner rotor with four permanent magnets. In other embodiments, however, different types of motors may be used, such as those with different number of phases, windings, and magnets. As shown in FIG. 7, the power switching network 700 includes three high side electronic switches 712, 716, 720 and three low side electronic switches 710, 714, 718, which are examples of the FETs 620 shown in FIG. 6. In the illustrated embodiment, the electronic switches 710-720 include MOSFETs. In other embodiments, other types of electronic switches may be used, such as bipolar junction transistors (BJT), insulated-gate bipolar transistors (IGBT), and other electronic switch types. Additionally, each electronic switch 710-720 is connected in parallel to a body diode 730, 732, 734, 736, 738, 740, respectively. In the diagram of FIG. 7, each phase of the motor 630 is represented by an inductor, a resistor, and a voltage source. Since the motor 630 is a three-phase motor, FIG. 7 illustrates three inductors 704a-c, three resistors 706a-c, and three voltage sources 702a-c. Each inductor 704a-c represents motor windings of each phase of the motor 630. Each resistor 706a-c represents motor windings of each phase of the motor 630. Each voltage source 702a-c represents the back electromagnetic force generated (i.e., back-electromotive force [emf]) in each phase. Back-emf is generated by the rotation of the rotor magnets inducing current in the stator windings. Additionally, the power switching network 700 includes the brake switch 640 connected in series with the stamped brake resistor 300. The brake switch 640 and stamped brake resistor 300 are connected in parallel to the first phase 750, the second phase 752, and the third phase 754 of the brushless DC motor 630.

The power switching network 700 receives power from the power interface 605. In the illustrated embodiment, the power interface 605 receives power from the battery pack 105. The battery pack 105 is represented by a power source 701 connected in series with a resistor 722 and inductor 724, which represent internal resistance and inductance of the power interface 605, the battery pack 105, or both. Additionally, the power source 701 is connected in series with a parallel combination of a diode 726 and a switch 727. The diode 726 and switch 727 control the flow of current from the power source 701. For example, the switch 727 is switchable between a conducting state and a non-conducting state. The switch 727 may be controlled based on the trigger 205. For example, in some embodiments, the electronic processor of the motor controller 615 controls the state of the switch 727 based on the condition of the trigger 205. For example, in some embodiments, the switch 727 is closed by the motor controller 615 when the trigger 205 is depressed, and the switch 727 is opened when the trigger 205 is released. In some embodiments, the switch 727 and the trigger 205 are an electromechanical device whereby the switch 727 is closed by the trigger 205 when the trigger 205 is depressed (e.g., a contact is pivoted to make an electrical connection), and the switch 727 is opened when the trigger 205 is released.

When the switch 727 is in the conducting state, current can flow bidirectionally to and from the power source 701. When the switch 727 is in the non-conducting state, however, current (e.g., regenerative current) can only flow to the power source 701 through the diode 726. In some embodiments, the diode 726 is not provided. A capacitor 728 is connected in parallel to the power source 701, as shown in FIG. 7. The capacitor 728 smooths the voltage from (and to) the power source 701. Additionally, the electronic processor of the motor controller 615 controls the state of each of the electronic switches 710-720 in the power switching network 700.

To drive the motor 630 forward, the electronic processor sets the switch 727 to be in the conducting state, and activates a high side electronic switch 712 and a low side electronic switch 714. As shown in FIG. 7, the high side electronic switch 712 is on a first side of the first phase 750 of the motor 630 and the low side electronic switch 714 is on a second side of the first phase 750. In such a configuration, the first phase 750 of the motor 630 is connected such that the back-emf has an opposite polarity with respect to the power source 701. Accordingly, while the electronic processor maintains the first high side electronic switch 712 and the first low side electronic switch 714 in a conducting state, the back-emf detracts from the overall power provided to the motor 630. In other words, the motor current is set by dividing the difference between the voltage from the power source 701 and the back-emf by the resistance of the motor 630. That is, the motor current is set based on the equation:

$$I_{motor} = \frac{(V_{power\,source} - V_{back-emf})}{R_{motor}}.$$

The electronic processor of the motor controller 615 determines which high side electronic switches 712, 716, 720 and low side electronic switches 710, 714, 718 to place in the conducting state based on the position of the rotor in relation to the stator of the motor 630. In particular, each activation of a pair of a high side electronic switch 712, 716, 720 and a low side electronic switch 710, 714, 718 rotates the motor 630 approximately 120 degrees. When the motor 630 rotates about 60 degrees, the electronic processor deactivates one pair of electronic switches and activates a different pair of electronic switches to energize a different phase of the motor 630. In particular, the electronic processor activates the first high side electronic switch 712 and the first low side electronic switch 714 to drive the first phase 750 of the motor forward. The electronic processor activates the second high side electronic switch 716 and the second low side electronic switch 718 to drive the second phase 752 of the motor 630 forward, and the electronic processor activates the third high side electronic switch 720 and the third low side switch 710 to drive the third phase 754 of the motor 630 forward. The switches 710-720 may be driven by the motor controller 615 using a pulse width modulated (PWM) control signal. During each phase, the motor controller 615 can set the current provided to the motor 630 (and thus speed and torque) by adjusting the duty ratio of the PWM control signal to one or both of the active switches.

Figure 8:
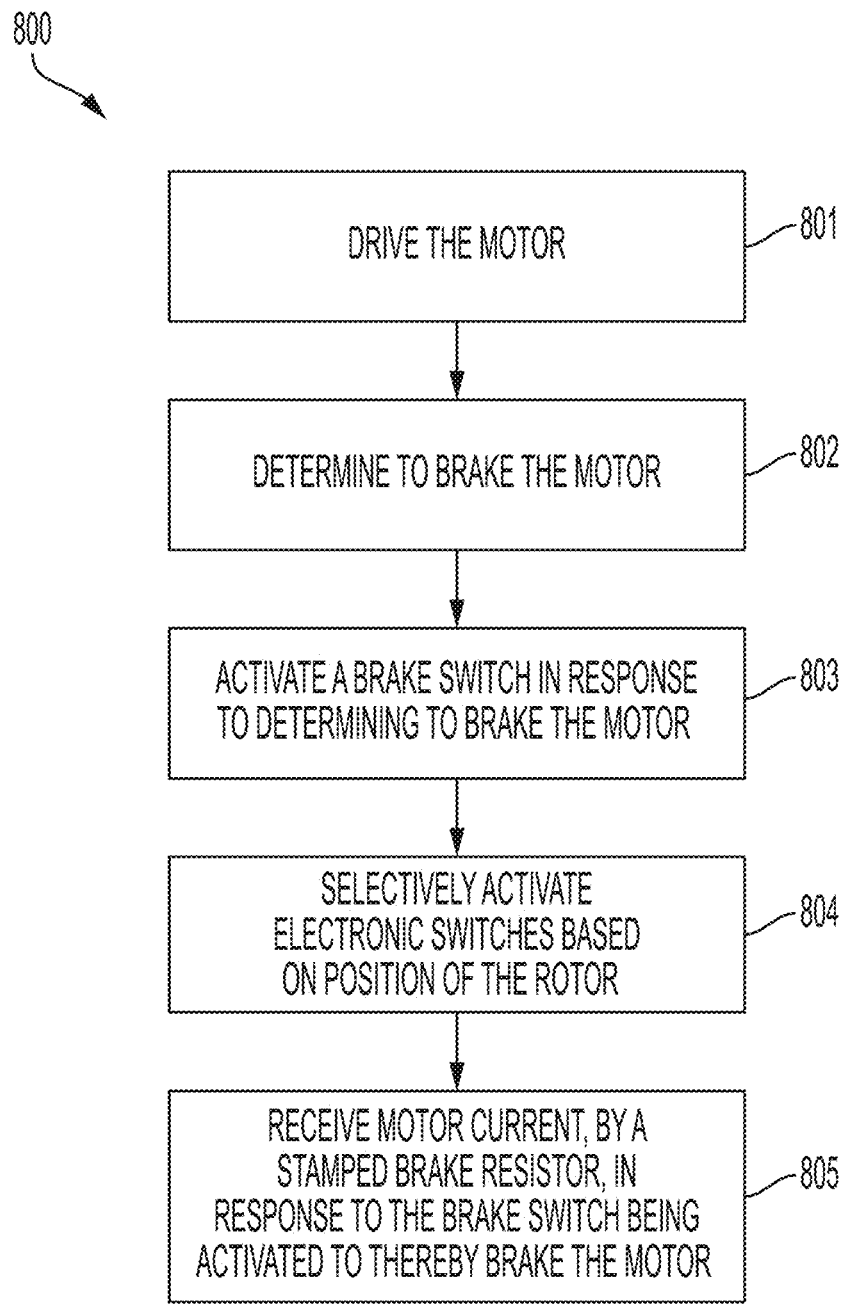
FIG. 8 illustrates a flow chart of a method that may be implemented by the power tool of FIG. 1, according to some embodiments.

In the illustrated embodiment, the electronic processor of the motor controller 615 also implements electronic braking of the motor 630. FIG. 8 is a flowchart illustrating a method 800 of electronically braking the motor 630. At block 801, the motor controller 615 drives the motor 630 (e.g., delivers power to the motor 630) based on a position of the trigger 205. For example, with reference to FIG. 6, a trigger signal is received via the user input 610 indicating to the motor controller 615 that the trigger 205 is depressed. In some embodiments, the trigger signal is binary indicating whether the trigger 205 is depressed or not depressed. In some embodiments, rather than a binary indication of whether the trigger 205 is depressed, a trigger sensor (e.g., potentiometer, Hall sensor, or the like) is provided as part of the user input 610 that indicates an amount of trigger depression (e.g., between 0-100%). In response to detecting that the trigger 205 is depressed, the motor controller 615 drives the motor 630 by providing control signals to the switches 710-720, as described above with respect to FIG. 7.

At block 802, the motor controller 615 determines to brake the motor 630. For example, the motor controller 615 may detect that the trigger 205 has been released, may detect a fault in the system 600 of the power tool 100, may detect a low state of charge of the battery pack 105 (e.g., using a voltage sensor to sense that battery voltage has dropped below a low voltage threshold), or the like.

At block 803, the motor controller 615 activates the brake switch 640, in response to determining to brake the motor 630, to connect the stamped brake resistor 300 with the motor 630. As illustrated in FIG. 7, the brake switch 640 is connected in series with the stamped brake resistor 300, and the series-connected stamped brake resistor 300 and brake switch 640 are connected to the power supply line providing power to the high side switches 712, 716, and 720.

At block 804, the motor controller 615 selectively activates power switching elements (e.g., high side electronic switches 712, 716, 720 and low side electronic switches 710, 714, 718) based on the position of the rotor in relation to the stator of the motor 630. In some embodiments, the motor controller 615 activates a pair of power switching elements (including one high side electronic switch and one low side electronic switch) that provides the lowest impedance path from the motor to the brake resistor 300, given the present position of the rotor of the motor 630. In other words, each potential pair of power switching elements that is selectable to be activated has an associated impedance at a moment in time, and the pair that offers the lowest impedance path of the potential pairs is activated. For example, the motor controller 615 may activate the high side electronic switch 712 and low side electronic switch 714 to provide a path from the first phase 750 when the rotor is in a first position, may activate the high side electronic switch 716 and low side electronic switch 718 to provide a path from the second phase 752 when the rotor is in a second position, and may activate the high side electronic switch 720 and low side electronic switch 710 to provide a path from the third phase 754 when the rotor is in a third position. In one example of a three-phase, six stator coil brushless motor, the selected pair of power switching elements activated by the motor controller 615 may change approximately every 60 degrees of rotation of the rotor. The activation may be performed by the motor controller 615 by providing a respective PWM signal to each of the power switch elements of the pair. At least in some embodiments, an expected impendence of the selectable pairs of power switching elements for a given rotor position is known (e.g., from experimental testing) such that the motor controller 615 has mapped (in memory) various rotor positions relative to pairs of power switching elements that should be activated at a particular moment in time to result in connecting the lowest impedance path. By providing the lowest impedance for the energized phase, a maximum motor current can flow from the energized phase of the motor 630 to the stamped brake resistor 300.

At block 805, the stamped brake resistor 300 receives motor current from the motor 630 in response to the brake switch 640 being activated to thereby brake the motor 630. The motor current may be, for example, current resulting from the back-emf of the motor 630.

In some embodiments, the power tool 100 may continue to execute the method 800 by looping back from block 805 to block 803 to continue to activate the brake switch 640, selectively activate a pair of the power switching elements, and direct motor current to the stamped brake resistor 300 while the motor is braked. Accordingly, as the rotor rotates during braking, the motor controller 615 continues to selectively activate the pair of power switching elements that provides the lowest impedance path based on the rotor position. Thus, the selected pair of power switching elements changes as the rotor rotates during braking of the motor.

In some embodiments, such as in the case of a brushed motor in the power tool 100, block 804 may be bypassed, as power switching elements as shown in FIG. 7 may not be present. For example, in some embodiments of the tool having a brushed motor, a single power switching element in series with the brushed motor is controlled by the motor controller via a PWM signal to regulate the motor speed or torque. In such embodiments, this power switching element may be held closed (e.g., with a 100% duty cycle PWM signal) while the brake switch 640 is closed in blocks 803 and 805.

In some embodiments, the motor controller 615 may be coupled to a solid state disconnect (SSD) PCB assembly (not shown). The SSD PCB assembly includes a solid state disconnect switch between the power interface 605 and the motor 630. The solid state disconnect switch is semiconductor-based, and may include a field effect transistor (FET), for example. When the solid state disconnect switch is closed, the solid state disconnect switch allows current to flow from the power interface 605 to the motor 630, and, when the solid state disconnect switch is open, the solid state disconnect switch prevents power from flowing to or from the power interface 605. In some embodiments, the motor controller 615 is configured to close the solid state disconnect switch in response to determining to drive the motor 630 (for example, in block 801). In some embodiments, the motor controller 615 is configured to open the solid state disconnect switch in response to determining to brake the motor 630 (for example, in block 803 before activating the brake switch 640). Opening the solid state disconnect switch in this manner prevents current resulting from the back-emf of the motor from flowing to the power interface 605 (e.g., power source 701). In some embodiments, the switch 727 of FIG. 7 represents the solid state disconnect switch.

In some embodiments, the motor controller 615 may be configured to deactivate the brake switch 640 in response to determining that the motor 630 has stopped rotating or dropped below a low speed threshold. The electronic processor may determine that the motor 630 has stopped or slowed below the threshold based on motor position information from the Hall sensors 625. For example, each Hall sensor 625 may output a pulse upon a rotor magnet of the motor 630 rotating across the face of the Hall sensor 625. Accordingly, the frequency of the pulses is proportional and indicative of the rotation speed of the motor 630, and the lack of pulses for a certain amount of time indicates that the motor 630 is not rotating.

Thus, the disclosure provides, among other things, a system and method of braking a motor of a power tool.

What is claimed is:

1. A brake resistor assembly selectively connectable to a motor via a brake switch, the brake resistor assembly comprising:
   a stamped brake resistor including a terminal portion and a resistive portion, the resistive portion including a planar serpentine path forming a plurality of leaves and a gap between each leaf, the resistive portion further including a first leg, a second leg perpendicular to the first leg, a third leg, and a fourth leg perpendicular to the third leg;
   a first insulating pad and a second insulating pad that sandwich the stamped brake resistor; and
   a first insulating sleeve and a second insulating sleeve configured to restrict electrical current flowing through the stamped brake resistor.

2. The brake resistor assembly of claim 1, wherein the planar serpentine path includes a filling substance located within each gap formed between adjacent leaves, the filling substance configured to maintain a shape of the stamped brake resistor.

3. The brake resistor assembly of claim 1, further comprising:
   a first heat sink and a second heat sink that sandwich the first insulating pad and the second insulating pad.

4. The brake resistor assembly of claim 3, wherein the stamped brake resistor includes a first engaging surface and a second engaging surface.

5. The brake resistor assembly of claim 4, wherein the first engaging surface engages with a third engaging surface of the first insulating pad.

6. The brake resistor assembly of claim 5, wherein the second engaging surface engages with a fourth engaging surface of the second insulating pad.

7. The brake resistor assembly of claim 1, wherein each leaf includes a first member extending substantially parallel to a second member.

8. The brake resistor assembly of claim 7, wherein:
the first member and the second member are separated by a gap at a first distal end; and
the first member and the second member are joined at a turnpoint at a second distal end.

9. The brake resistor assembly of claim 1, wherein the stamped brake resistor includes a plurality of interlock gaps.

10. A method of stacking a brake resistor assembly of a power tool, the method comprising:
providing a stamped brake resistor, the stamped brake resistor including a terminal portion and a resistive portion, wherein the resistive portion includes a planar serpentine path forming a plurality of leaves and a gap between each leaf, the resistive portion further including a first leg, a second leg perpendicular to the first leg, a third leg, and a fourth leg perpendicular to the third leg;
providing a first insulating pad, a second insulating pad, a first heat sink, a second heat sink, and a plurality of fasteners, wherein each of the stamped brake resistor, the first insulating pad, the second insulating pad, the first heat sink, and the second heat sink, includes a plurality of holes;
aligning, by stacking the first insulating pad, the second insulating pad, the first heat sink, and the second heat sink, the plurality of holes to form a plurality of passages; and
securing, by passing a fastener of the plurality of fasteners through a passage of the plurality of passages, the stamped brake resistor, the first insulating pad, the second insulating pad, the first heat sink, and the second heat sink together.

11. The method of claim 10, further comprising:
attaching, by engaging each of the plurality of fasteners with a threaded bore of a housing of the power tool, the brake resistor assembly to the power tool.

12. The method of claim 10, wherein each of the first insulating pad, the second insulating pad, the first heat sink, and the second heat sink includes four corners, each corner having one hole of the plurality of holes.

13. A braking system for a power tool, the braking system comprising:
a stamped brake resistor having a terminal portion and a resistive portion, the resistive portion including a planar serpentine path forming a plurality of leaves and a gap between each leaf, the resistive portion further including a first leg, a second leg perpendicular to the first leg, a third leg, and a fourth leg perpendicular to the third leg;
a first insulating pad and a second insulating pad that sandwich the stamped brake resistor; and
a controller including an electronic processor and a memory, the controller connected to a motor and a brake switch, the controller configured to:
control power delivered to the motor based on a position of a trigger,
determine to brake the motor during operation of the motor, and
activate, in response to determining to brake the motor, the brake switch to connect the stamped brake resistor to the motor.

14. The braking system of claim 13, further comprising:
a first heat sink and a second heat sink that sandwich the first insulating pad and the second insulating pad.

15. The braking system of claim 13, wherein the stamped brake resistor includes a first engaging surface and a second engaging surface.

16. The braking system of claim 15, wherein the first engaging surface engages with a third engaging surface of the first insulating pad.

17. The braking system of claim 16, wherein the second engaging surface engages with a fourth engaging surface of the second insulating pad.

18. The braking system of claim 13, wherein:
each leaf includes a first member extending substantially parallel to a second member;
the first member and the second member are separated by a gap at a first distal end; and
the first member and the second member are joined at a turnpoint at a second distal end.

19. The braking system of claim 13, wherein the stamped brake resistor includes a plurality of interlock gaps.

20. The braking system of claim 13, wherein the controller is further configured to:
determine, using feedback from a plurality of Hall effect sensors, one or more of a motor position, a motor velocity, and a motor acceleration.

* * * * *